(12) United States Patent
Miller et al.

(10) Patent No.: US 6,632,382 B1
(45) Date of Patent: Oct. 14, 2003

(54) EXTRUDED FOAM PRODUCT WITH REDUCED SURFACE DEFECTS

(75) Inventors: Larry Michael Miller, Suffield, OH (US); Raymond Marshall Breindel, Hartville, OH (US); Mitchell Zane Weekley, Tallmadge, OH (US); Thomas Earl Cisar, Cuyahoga Falls, OH (US)

(73) Assignee: Owens-Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/511,863

(22) Filed: Feb. 29, 2000

(51) Int. Cl.⁷ ............... B29D 7/00; C08J 9/00
(52) U.S. Cl. .......... 264/45.9; 264/51; 264/53; 521/79; 521/81; 521/98
(58) Field of Search .............. 521/98, 79, 81; 264/45.9, 51, 53

(56) References Cited

U.S. PATENT DOCUMENTS

| | | | | |
|---|---|---|---|---|
| 4,434,252 A | * | 2/1984 | Dorrestijn | 521/81 |
| 4,657,715 A | | 4/1987 | Myers et al. | |
| 4,695,594 A | * | 9/1987 | Pressman | 521/79 |
| 4,728,674 A | * | 3/1988 | Wroczynski | 521/79 |
| 4,728,675 A | * | 3/1988 | Pressman | 521/79 |
| 4,747,983 A | | 5/1988 | Colombo | |
| 4,791,145 A | * | 12/1988 | Pressman | 521/79 |
| 4,855,096 A | | 8/1989 | Panaroni | |
| 4,857,390 A | * | 8/1989 | Allen et al. | |
| 5,071,882 A | | 12/1991 | Godfrin | |
| 5,102,611 A | | 4/1992 | Wolfe et al. | |
| 5,334,337 A | | 8/1994 | Voelker et al. | |
| 5,346,926 A | * | 9/1994 | Sakamoto et al. | 521/81 |
| 5,437,822 A | | 8/1995 | Wada et al. | |
| 5,474,841 A | | 12/1995 | Matsuki et al. | |
| 5,496,865 A | * | 3/1996 | Heese et al. | 521/81 |
| 5,585,410 A | | 12/1996 | Scherzer et al. | |
| 5,665,785 A | | 9/1997 | McClellan et al. | |
| 5,728,744 A | * | 3/1998 | Okada et al. | 521/81 |
| 5,900,311 A | | 5/1999 | Campanella et al. | |
| 6,069,183 A | * | 5/2000 | Wilkes et al. | 521/79 |

FOREIGN PATENT DOCUMENTS

| | | |
|---|---|---|
| AT | 328746 B | 4/1976 |
| EP | 0 427 533 BI | 5/1991 |
| EP | 0 477 476 A2 | 4/1992 |
| EP | 0 969 037 A1 | 1/2000 |

* cited by examiner

*Primary Examiner*—Morton Foelak
(74) *Attorney, Agent, or Firm*—Inger H. Eckert; Stephen W. Barns; Maria C. Gasaway

(57) ABSTRACT

The present invention generally relates to processes for preparing extruded foam products and more particularly to a process for producing such products wherein surface defects are minimized. There has been a movement to replace conventional halo-carbon blowing agents in favor of purportedly more environmentally safe halo-carbon free blowing agents such as carbon dioxide, nitrogen, argon, water, air, nitrogen, and helium. However, these halo-carbon free blowing agents, in particular carbon dioxide, have higher foaming rates and higher volatility leading to greater surface defects in the extruded foam. The present invention employs polyethylene wax to reduce or eliminate the occurrence of surface defects where halo-carbon free blowing agents are employed in an extruded foam manufacture process. The polyethylene wax containing extruded foam products of this invention are characterized by a generally smooth substantially defect free surface and contain a majority of closed cells which are free of any trapped halo-carbon blowing agents.

27 Claims, 3 Drawing Sheets

(3 of 3 Drawing Sheet(s) Filed in Color)

EXTRUDED FOAM PRODUCT WITH REDUCED SURFACE DEFECTS

FIELD OF THE INVENTION

The present invention generally relates to processes for preparing extruded foam products and more particularly to a process for producing such products wherein surface defects are minimized.

BACKGROUND OF THE INVENTION

Extruded synthetic resinous foams are useful materials for many applications including thermal insulation, decorative purposes, packaging and the like. Because of the manufacturing process, extruded foams have surface defects marring their appearance. These defects often produce a rippled or pebbled surface. It is desirable to reduce these defects and improve the surface appearance of these boards.

There has been a movement to replace conventional halo-carbon blowing agents in favor of purportedly more environmentally safe halo-carbon free blowing agents such as carbon dioxide, nitrogen, argon, water, air, nitrogen, and helium. However, these halo-carbon free blowing agents, in particular carbon dioxide, have higher foaming rates and higher volatility leading to greater surface defects in the extruded foam.

It would be desirable to discover an additive to the extruded foam manufacturing process that both reduces or eliminates surface defects when halo-carbon free blowing agents are used.

SUMMARY OF THE INVENTION

The present invention employs polyethylene wax to reduce or eliminate the occurrence of surface defects where halo-carbon free blowing agents are employed in an extruded foam manufacture process. Polyethylene wax has been reported to increase cell sizes when in an extruded foam manufacture process employing halo-carbon blowing agents (EP 0 427 533 B1), but it has now been discovered surprisingly that addition of polyethylene wax in an extruded foam manufacture process reduces or eliminates the occurrence of surface defects in the final product when halo-carbon free blowing agents are employed.

The polyethylene wax containing extruded foam products of this invention are characterized by a generally smooth substantially defect free surface and contain a majority of closed cells which are free of any trapped halo-carbon blowing agents.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DESCRIPTION OF PREFERRED EMBODIMENTS

Extruded Foam Manufacture Process

Figure 1:
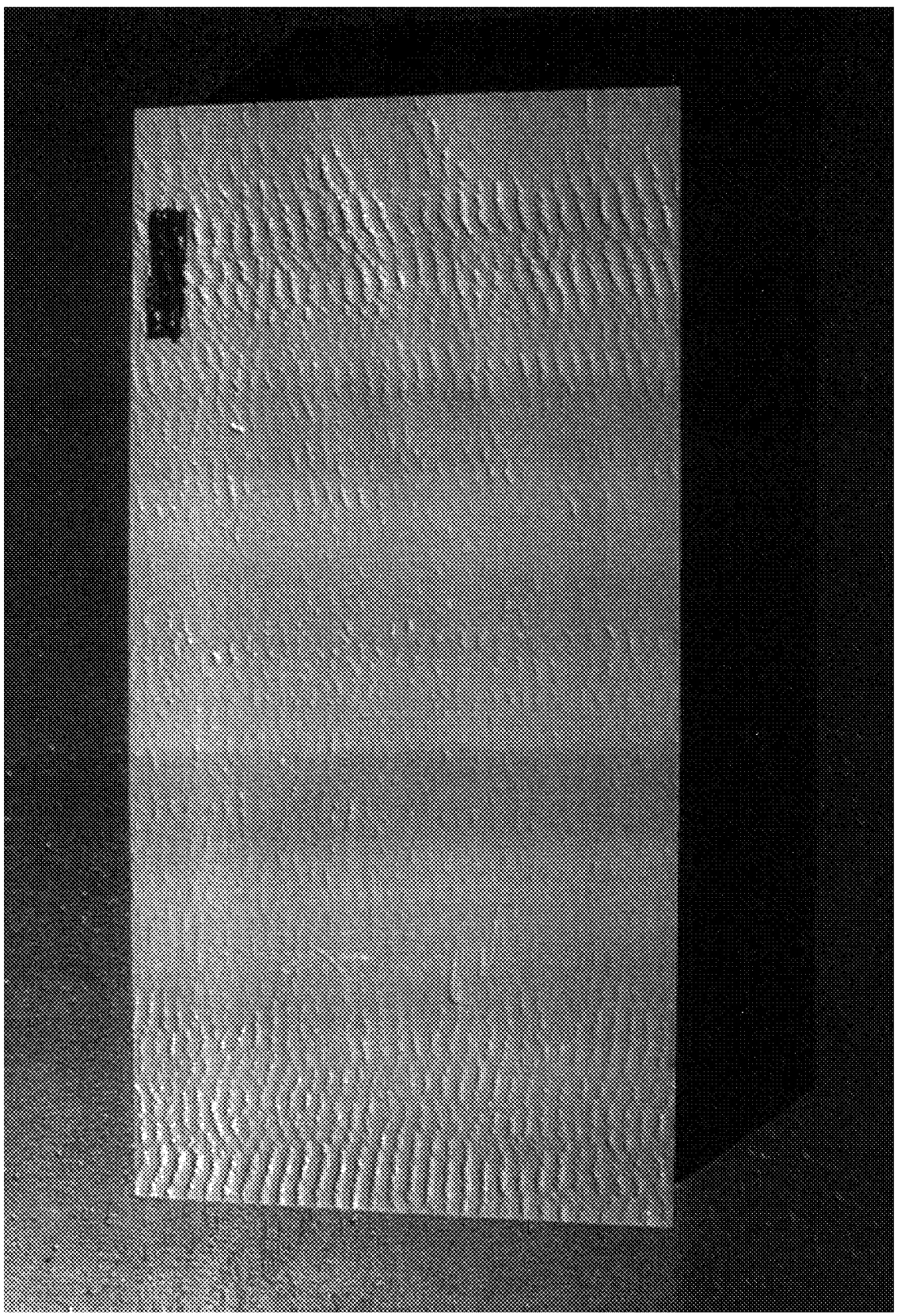
FIG. 1 depicts an extruded foam product wherein polyethylene wax was added in the manufacturing process.

Although the polyethylene wax of this invention may be incorporated in any process for making extruded foam products, the preferred extruded foam manufacture process comprises heating, to a first temperature, a resin mixture comprising polymer thereby producing a plastified resin mixture; incorporating one or more fluid blowing agents and thoroughly mixed with the plastified resin mixture under a first pressure and under conditions permitting thorough mixing of the blowing agent into the plastified resin mixture while preventing foaming of the mixture. Once the blowing agent is incorporated and thoroughly mixed with the plastified resin mixture the resulting composition is referred to as a foamable gel. The foamable gel is then cooled to a second temperature (generally referred to as die melt temperature), and is extruded into a zone of reduced pressure (second pressure) resulting in foaming of the gel and formation of the desired extruded foam product.

The first temperature must be sufficient to plastify or melt the mixture. Preferably the first temperature is from 135–240° C., more preferably is from 145–210° C., and most preferably from 150–165° C. Preferably the second temperature or die melt temperature is cooler than the first temperature. The die melt temperature is preferably from 140–105° C., more preferably from 130–110° C., most preferably from about 125–115° C.

The first pressure must be sufficient to prevent prefoaming of the foamable gel which contains the blowing agent. Prefoaming involves the undesirable premature foaming of the foamable gel before extrusion into a region of reduced pressure. Accordingly, the first pressure varies depending upon the identity and amount of blowing agent in the foamable gel. In one embodiment, the first pressure is from 700–4500 psia (4.826–31.02 MPa). In another embodiment, the first pressure is from 840–4000 psia (5.791–27.57 MPa). In a preferred embodiment, the first pressure is from 1150–3500 psia (7.928–27.57 MPa). In the most preferred embodiment, the first pressure is from 2600–3495 psia (17.93–24.1 MPa).

The second pressure is sufficient to induce conversion of the foamable gel into a foam body and may be above, at, or below atmospheric pressure. In one embodiment, the second pressure is from 0–28 psia (0–193 kPa). In another embodiment, the second pressure is from 1.4–21 psia (9.652–144.7 kPa). In a preferred embodiment, the second pressure is from about 2.8–15 psia (19.30–103.4 kPa).

Polymer

Any polymer capable of being foamed may be used as the polymer in the resin mixture. The polymer may be thermoplastic or thermoset. Suitable plastics include polyolefins, polyvinylchloride, alkenyl aromatic polymers, polycarbonates, polyetherimides, polyamides, polyesters, polyvinylidene chloride, polymethylmethacrylate, polyurethanes, polyisocyanurates, phenolics, copolymers and terpolymers of the foregoing, thermoplastic polymer blends, rubber modified polymers, and the like. Suitable polyolefins include polyethylene and polypropylene, and ethylene copolymers.

A preferred thermoplastic polymer comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_2$-$C_6$ alkyl acids and esters, ionomeric derivatives, and $C_2$-$C_6$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred structures comprise substantially (i.e., greater than 95 percent) and most preferably entirely of polystyrene.

The properties of the extruded foam product can be modified by selection of the molecular weight of the polymer. For example, the preparation of lower density extruded foam products is facilitated by using lower molecular weight polymers whereas the preparation of higher density extruded foam products is facilitated by the use of higher molecular weight or higher viscosity resins.

Polyethylene Wax

The polyethylene wax used according to this invention is preferably a low molecular weight polyethylene wax having an average molecular weight preferably from 500 to 5000, more preferably from 1000 to 4000, and most preferably from to 2000–3000. A suitable wax my be obtained from Baker Petrolite under the designation POLYWAX 3000. The polyethylene wax is preferably incorporated in an extruded foam manufacture process in the amount of from 0.01 to 1.00 wt. % based on the resin, more preferably from 0.1 to 0.7 wt %, and most preferably from 0.2 to 0.4 wt. %. Preferably the polyethylene wax is added to the resin mixture but may be incorporated in alternative ways to the extruded foam manufacture process. For example, the polyethylene wax may be incorporated before, during or after polymerization process used to make the polymer in the resin mixture.

Optional Additives

Optional additives which may be incorporated in the extruded foam manufacture process include nucleating agents, infrared attenuating agents, plasticizers, flame retardant chemicals, pigments, elastomers, extrusion aids, antioxidants, fillers, antistatic agents, UV absorbers, etc. These optional additives may be included in any amount to obtain desired characteristics of the foamable gel or resultant extruded foam products. Preferably, optional additives are added to the resin mixture but may be added in alternative ways to the extruded foam manufacture process. For example, optional additives may be incorporated before, during or after the polymerization process used to make the polymer in the resin mixture.

Examples of nucleating agents useful in the invention include talc, calcium silicate, calcium carbonate, calcium stearate, clay, silica, titanium dioxide, barium sulfate, diatomaceous earth, indigo, etc. In one embodiment, from about 0.01 to about 2 parts of nucleating agent per 100 parts of the polymer are incorporated into the foamable gel. In a preferred embodiment, from about 0.05 to about 1 part of nucleating agent per 100 parts of the polymer is incorporated into the foamable gel. Preferably, talc is added to the resin mixture as a nucleating agent in the amount of from 0.1 to 5.0 wt. % based on the polymer, preferably from 0.1 to 1.0 wt. %, and most preferably from 0.4 to 0.6 wt. %.

Plasticizers may also be added in the extruded foam manufacture process, preferably added to the foamable gel to facilitate processing of the foamable gel in an extruder. In a preferred embodiment, the plasticizer is a low molecular weight resin (molecular weight below about 20,000). Examples of plasticizers include liquid paraffin or white oil, hydrogenated coconut oil, esters of $C_4$-$C_{20}$ monoalcohols, diols glycerine with higher fatty acids, styrene resin, vinyl toluene resin, alpha-methylstyrene resin, lower alcohols (containing 1 to about 4 carbon atoms), etc. In one embodiment, from about 0.1 to about 20 parts of plasticizer per 100 parts of the polymer is incorporated into the foamable gel. In a preferred embodiment, from about 1 to about 15 parts of plasticizer per 100 parts of the polymer are incorporated into the foamable gel.

Flame-retardant chemicals may also be added in the extruded foam manufacture process, preferably added to the foamable gel to impart flame retardant characteristics to the resulting extruded foam products. Flame-retardant chemicals include brominated aliphatic compounds such as hexabromocyclododecane and pentabromocyclohexane, brominated phenyl ethers, esters of tatrabromophthalic acid, and combinations thereof. In one embodiment, from about 0.1 to about 5 parts of flame-retardant chemicals per 100 parts of the polymer is incorporated into the foamable gel. In a preferred embodiment, from about 0.5 to about 3 parts of flame-retardant chemicals per 100 parts of the polymer are incorporated into the foamable gel.

Halo-carbon free Blowing Agents

Any suitable halo-carbon free blowing agent may be used in the practice on this invention. Suitable halo-carbon free blowing agents include carbon dioxide, nitrogen, argon, water, air, nitrogen, and helium.

In a preferred embodiment of this invention, the blowing agent utilized contains a major amount of carbon dioxide. In one embodiment, the amount of the blowing agent added to make the foamable gel is from about 1% to about 16% by weight based on the weight of the polymer. In another embodiment, the amount of the blowing agent added to make the foamable gel is from about 2% to about 15% by weight based on the weight of the polymer. In yet another embodiment, the amount of the blowing agent added to the foamable gel is from about 3% to about 10% by weight based on the weight of the polymer. In a preferred embodiment, the amount of the blowing agent added to the foamable gel is from about 4% to about 8% by weight based on the weight of the polymer. Variations in the amount of blowing agent incorporated into the foamable gel may be utilized, depending in part on the components of the blowing agent mixtures, to prepare extruded foam products having different desirable characteristics.

A major amount of carbon dioxide means that the blowing agent contains more than 50% by weight carbon dioxide. In one embodiment, the blowing agent contains more than about 60% carbon dioxide, and particularly from 65–100% of carbon dioxide. In another embodiment, the blowing agent contains from 70–90% of carbon dioxide. In yet another embodiment, the blowing agent may be about 100% of carbon dioxide.

The blowing agent may be a mixture of carbon dioxide and at least one lower alcohol. A lower alcohol is an alkyl alcohol containing from 1 to about 4 carbon atoms. Lower alcohols include methanol, ethanol, propanol, isopropanol and butanol. The above carbon dioxide and blowing agent mixtures may also be used with additional, optional and supplemental blowing agents, most notably air, nitrogen and water as described below.

Particularly useful mixtures of blowing agents include mixtures comprising: 51–90% of carbon dioxide and 10–49% of ethanol; 60–80% of carbon dioxide and 20–40% of ethanol; 51–90% of carbon dioxide and 10–49% of methanol; 60–80% of carbon dioxide and 20–40% of methanol; 51–90% of carbon dioxide and 10–49% of water; and 60–80% of carbon dioxide and 20–40% of water. The optional use of a lower alcohol in combination with carbon dioxide provides extruded expanded foam products or bodies having larger cell sizes (from about 1% to about 25% larger in size) when compared to similar density bodies produced with carbon dioxide without a lower alcohol. Additionally, the blowing agent blends including carbon dioxide may contribute to extruded foam products or bodies having improved compressive strengths at comparable densities. Extruded foam products of acceptable characteristics are obtained utilizing the above blowing agent and blowing agent mixtures, and there is no necessity to use halo-carbon blowing agents.

In a preferred embodiment, the blowing agent is free of halo-carbon blowing agents. Examples of halo-carbon blowing agents include as chlorofluorocarbons, fluorocarbons, soft chlorofluorocarbons, fluorohydrocarbons, and chlorofluorohydrocarbons (typically of methane and ethane). Specific examples of halo-carbon blowing agents include methylchloride, ethylchloride, chlorotrifluoromethane, dichlorodifluoromethane, 1,2,2-trifluoro-1,1,2-trichloroethane, chlorodifluoromethane, 1,1-dichloro-2,2,2-trifluoroethane, 1-chloro-1,1-difluoroethane, 1,1,1,2-tetrafluoroethane and 1,1-di-chloro-1-fluoroethane among others. Since halo-carbon blowing agents can be harmful to the environment, their use is not desirable.

The blowing agent including blowing agent mixtures utilized in the process may be added to make the foamable gels in any conventional manner. The blowing agent can be incorporated to make the foamable gel before, during or after polymerization of the polymer used to make the foamable gel. In one embodiment, the foamable gel is made by directly injecting the blowing agent into a heat plastifying and mixing apparatus, such as an extruder, which contains a plastified resin mixture. When more than one blowing agent is to be utilized, each of the blowing agents may be separately injected into the heat plastifying and mixing apparatus.

Extruded Foam Product Properties

The extruded foam products prepared in accordance with the invention are characterized generally as having the following characteristics.

The resultant extruded foam products generally have a relatively low density, typically less than about 3 lbs/ft$^3$ (48.0 kg/m$^3$). Density can be determined, for example, in accordance with ASTM D1622-88. In one embodiment, the extruded foam products have a density from 0.1–3.75 lbs/ft$^3$ (1.60–60.0 kg/m$^3$) In another embodiment, the extruded foam products have a density from 0.5–3.75 lbs/ft$^3$ (8.00–60.0 kg/M$^3$) In a preferred embodiment, the extruded foam products have a density from 1–3.75 lbs/ft$^3$ (16.0–60. kg/M$^3$). In a more preferred embodiment, the extruded foam products have a density from 1.5–3.56 lbs/ft$^3$ (24.0–57.0 kg/m$^3$).

The resultant extruded foam products generally have a relatively small average cell size, typically less than about 0.4 mm. Average cell size can be determined, for example, according to ASTM D3576-77. In one embodiment, the extruded foam products have an average cell size from about 0.01 to about 0.4 mm. In another embodiment, the extruded foam products have an average cell size from about 0.05 to about 0.35 mm. In a preferred embodiment, the extruded foam products have an average cell size from about 0.1 to about 0.3 mm. In a more preferred embodiment, the extruded foam products have an average cell size from about 0.15 to about 0.25 mm.

The resultant extruded foam products generally have a relatively uniform average cell size, typically more than about 50% of the cells have a size within about 0.06 mm of the average cell size. In one embodiment, more than about 60% of the cells have a size within about 0.06 mm of the average cell size. In another embodiment, more than about 50% of the cells have a size within about 0.05 mm of the average cell size. In yet another embodiment, more than about 50% of the cells have a size within about 0.045 mm of the average cell size.

The resultant extruded foam products generally contain a major amount of closed cells and a minor amount of open cells. The relative amount of closed cells can be determined, for example, according to ASTM D2856-A. In one embodiment, more than about 70% of the cells of the resultant extruded foam products are closed cells. In another embodiment, more than about 80% of the cells of the resultant extruded foam products are closed cells. In a preferred embodiment, more than about 90% of the cells of the resultant extruded foam products are closed cells. In a more preferred embodiment, more than about 95% of the cells of the resultant extruded foam products are closed cells.

When traditional halo-carbon blowing agents such as chlorofluorocarbons (CFCs), hydrofluorochlorocarbons (HCFCs), and hydrofluorocarbons (HFCs) as used to make extruded foam products, the halogen blowing agent is trapped in the closed cells of the foam product. Since a halo-carbon free blowing agent is used, there is no trapped halogen blowing agent in the extruded foam products of the present invention.

In one embodiment, the resultant extruded foam products made in accordance with the present invention have dimensional stability in any direction of about 5% or less. In another embodiment, the resultant extruded foam products made in accordance with the present invention have dimensional stability in any direction of about 4% or less. In a preferred embodiment, the resultant extruded foam products made in accordance with the present invention have dimensional stability in any direction of about 3% or less. In a more preferred embodiment, the resultant extruded foam products made in accordance with the present invention have dimensional stability in any direction of about 2% or less.

The extruded foam products of this invention have a length, width, and a thickness. The length is parallel to the direction which the foamable gel is pushed or extruded through a given die and is also referred to as the extrusion direction or the x-axis. The width is perpendicular to and shares the same plane as the length as is also referred to as the horizontal direction or the y-axis. Thickness is perpendicular to both length and width and is also referred to as the vertical direction or z-axis.

EXAMPLE

Figure 2:
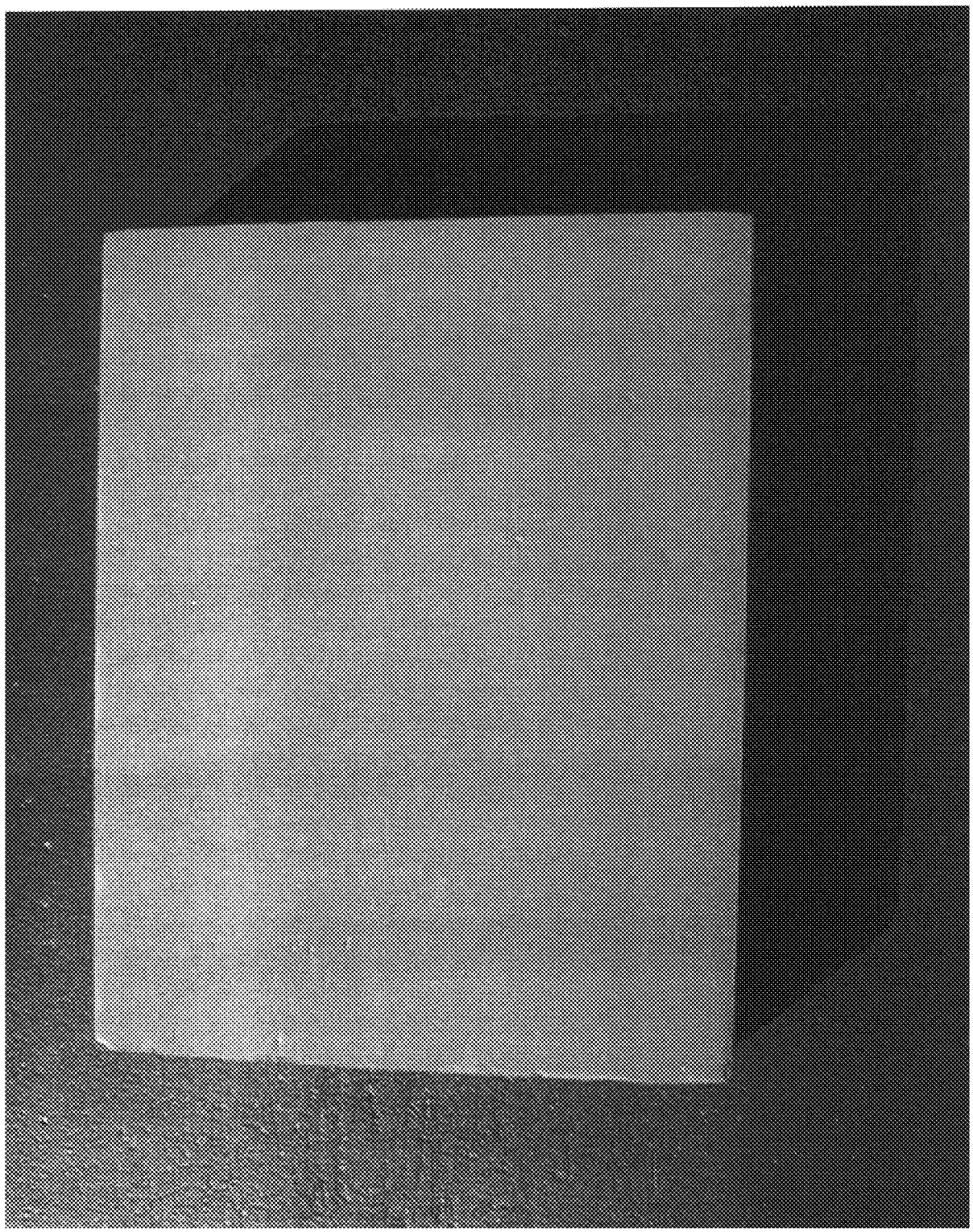
FIG. 2. depicts an extruded foam product manufactured under similar conditions as the foam product of FIG. 1 except no polyethylene wax was added in the manufacturing process.
Figure 3:
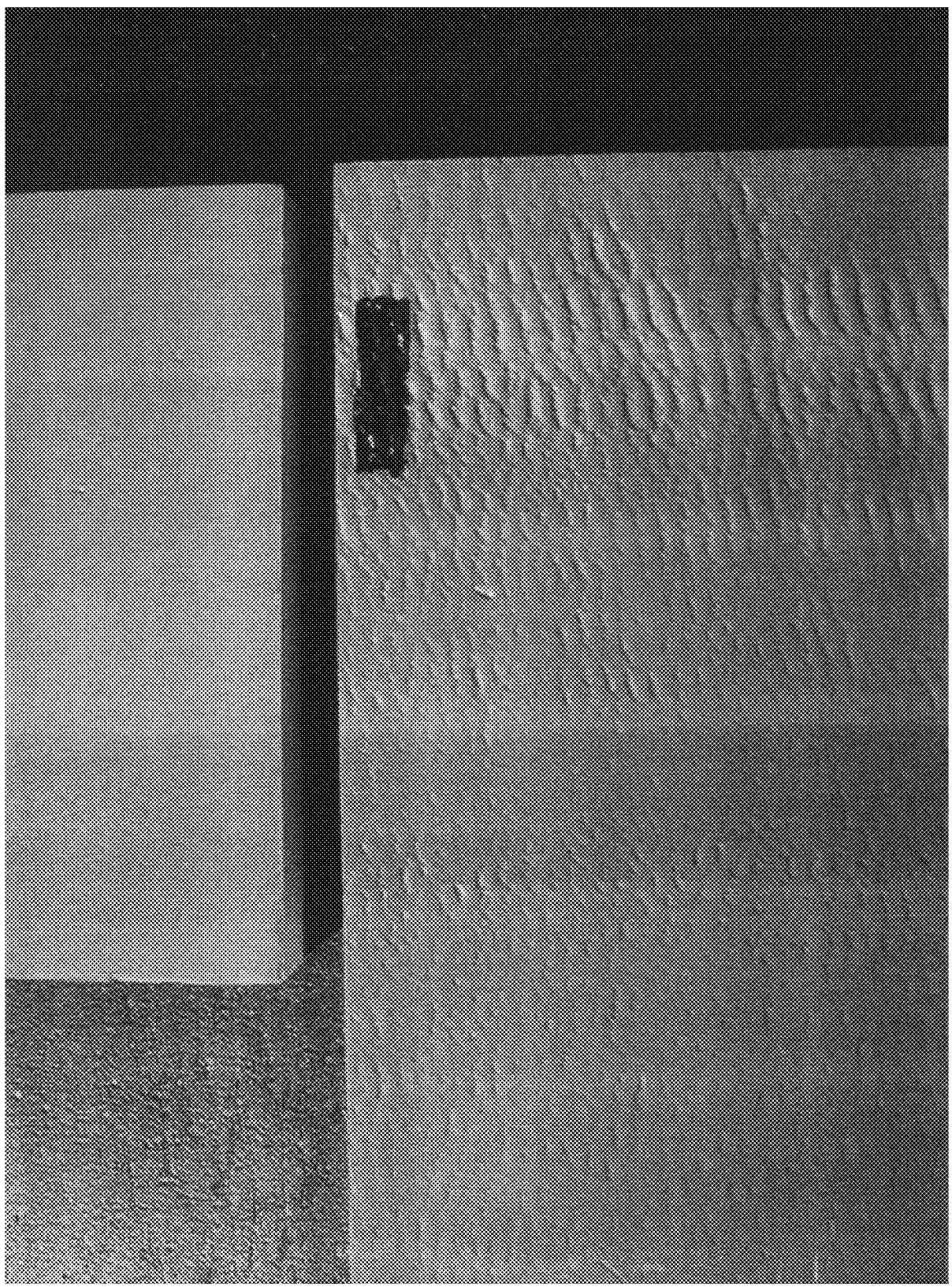
FIG. 3. depicts a side by side comparison of the extruded foam product in FIG. 1 and FIG. 2.

Polystyrene was fed to a corotating twin screw extruder at a rate of 160 kgs/hr, along with a flame retardant. Talc at 0.4%, based on polystyrene, was added as a nucleating agent, and polyethylene wax at 0.4%, based on polystyrene, was added to improve the surface quality. The mixture was melted in the extruder and mixed with 6.35 kgs/hr of carbon dioxide and 2.18 kgs/hr of ethanol. The resulting gel was cooled and foamed in a region of lower pressure, resulting in a 42.2 mm thick by 683 mm wide foam board. The foam board produced had a density of 57.4 kgs/cubic meter an average cell diameter of 0.214 mm and a very good surface as depicted by FIG. 2.

COMPARATIVE EXAMPLE

Polystyrene was fed to a corotating twin screw extruder at a rate of 160 kgs/hr, along with a flame retardant. Talc at 0.4%, based on polystyrene, was added as a nucleating agent. The mixture was melted in the extruder and mixed with 6.12 kgs/hr of carbon dioxide and 2.08 kgs/hr of ethanol. The resulting gel was cooled and foamed in a region of lower pressure, resulting in a 39.4 mm thick by 775 mm wide foam board. The foam board produced had a density of 54.5 kgs/cubic meter and an average cell diameter of 0.184 mm. The product had a very poor surface and ripples across the width of the product as depicted by FIG. 1.

What is claimed is:

1. An extruded polymer foam product having improved surface characteristics comprising an alkenyl aromatic polymer and polyethylene wax, said alkenyl aromatic polymer comprising at least 50 weight percent of the extruded polymer foam product; wherein the polymer foam product comprises at least about 70 percent by weight closed cells as measured by ASTM D2856-A; wherein said closed cells are free of halo-carbon blowing agents; and wherein said polymer foam product has a first temperature of about 135° C. to about 175° C. and a die melt temperature of about 105° C. to about 130° C.

2. The product of claim 1 wherein the polyethylene wax has an average molecular weight of from 500–5000.

3. The product of claim 1 wherein the polyethylene wax has an average molecular weight of from 1000–4000.

4. The product of claim 1 wherein the polyethylene wax has an average molecular weight of about 2000–3000.

5. The product of claim 1 further comprising a nucleating agent.

6. The product of claim 1 further comprising a plasticizer.

7. The product of claim 1 further comprising a flame retardant.

8. The product of claim 1 having a density of 1.60 to 60.0 kg/m$^3$ as measured by ASTM D 1622-88.

9. The product of claim 1 having an average cell size from about 0.01 to about 0.4 mm as measured by ASTM D3576-77.

10. A method for making an extruded foam product having improved surface characteristics comprising:
   a) heating to a first temperature of about 135° C. to about 175° C. a resin mixture comprising an alkenyl aromatic polymer, thereby melting the resin mixture to produce a plastified resin mixture, wherein said alkenyl aromatic polymer comprises at least 50 weight percent of the extruded foam product,
   b) thoroughly mixing one or more halo-carbon free blowing agents under a first pressure and under conditions to prevent foaming thereby producing a foamable gel, and
   c) cooling the foamable gel to a second temperature of about 105° C. to about 130° C. and extruding the foamable gel into a second pressure less than the first pressure thereby causing the foaming of the foamable gel and formation of the extruded foam product, wherein polyethylene wax is added in the process.

11. The method of claim 10 wherein said polyethylene wax is added to the resin mixture.

12. The method of claim 10 wherein said polyethylene wax has an average molecular weight of from 500–5000.

13. The method of claim 10 wherein said polyethylene wax has an average molecular weight of from 1000–4000.

14. The method of claim 10 wherein said polyethylene wax has an average molecular weight of from 2000–3000.

15. The method of claim 10 wherein a nucleating agent is added to the resin mixture.

16. The method of claim 10 wherein a flame retardant is added to the resin mixture.

17. The method of claim 10 wherein a plasticizer is added to the resin mixture.

18. The method of claim 10 wherein the blowing agent comprises a major amount of carbon dioxide.

19. The method of claim 18 wherein the blowing agent further comprises ethanol or methanol or mixtures thereof.

20. The method of claim 19 wherein the blowing agent comprises carbon dioxide and ethanol.

21. A method for reducing surface defects in an extruded foam product comprising:
   a) heating to a first temperature of about 135° C. to about 175° C. a resin mixture comprising an alkenyl aromatic polymer, thereby melting the resin mixture to produce a plastified resin mixture, wherein said alkenyl aromatic polymer comprises at least 50 weight percent of the extruded foam product,
   b) throughly mixing one or more halo-carbon free blowing agents under a first pressure and under conditions to prevent foaming thereby producing a foamable gel, and
   c) cooling the foamable gel to a second temperature of about 105° C. to about 130° C. and extruding the foamable gel into a second pressure less than the first pressure thereby causing the foaming of the foamable gel and formation of the extruded foam product, wherein polyethylene wax is added in the process.

22. A product as in claim 1, wherein the extruded foam product having improved surface characteristics comprises substantially polystyrene as the polymer.

23. A product as in claim 1, wherein the extruded foam product having improved surface characteristics consists essentially of an alkenyl aromatic polymer or a copolymer thereof.

24. A method as in claim 10, wherein the polymer is substantially polystyrene.

25. A method as in claim 10, wherein the polymer consists essentially of an alkenyl aromatic polymer or a copolymer thereof.

26. A method as in claim 21, wherein the polymer is substanitally polystyrene.

27. A method as in claim 21, wherein the polymer consists essentially of an alkenyl aromatic polymer or a copolymer thereof.

* * * * *